United States Patent
Parks et al.

(10) Patent No.: US 12,355,776 B2
(45) Date of Patent: *Jul. 8, 2025

(54) COMPUTING SYSTEM PERMISSION ADMINISTRATION ENGINE

(71) Applicant: Salesforce, Inc., San Francisco, CA (US)

(72) Inventors: Freeman Parks, San Francisco, CA (US); Ryan D. Woebkenberg, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,336

(22) Filed: May 6, 2024

(65) Prior Publication Data

US 2024/0348620 A1 Oct. 17, 2024

Related U.S. Application Data

(63) Continuation of application No. 17/812,977, filed on Jul. 15, 2022, now Pat. No. 12,010,120, which is a
(Continued)

(51) Int. Cl.
*H04L 9/40* (2022.01)
*G06F 18/24* (2023.01)
(Continued)

(52) U.S. Cl.
CPC ............ *H04L 63/104* (2013.01); *G06F 18/24* (2023.01); *G06N 7/01* (2023.01); *G06N 20/00* (2019.01);
(Continued)

(58) Field of Classification Search
CPC ... H04L 63/104; H04L 63/101; H04L 63/102; G06N 20/00; G06N 7/01; G06F 18/24
See application file for complete search history.

(56) References Cited

U.S. PATENT DOCUMENTS

| 7,437,718 | B2 | 10/2008 | Fournet et al. |
| 11,121,981 | B1 * | 9/2021 | Ping .................... H04L 67/1008 |

(Continued)

OTHER PUBLICATIONS

U.S. Appl. No. 17/812,977, USPTO e-Office Action: CTNF—Non-Final Rejection, Sep. 21, 2023, 9 pages.
(Continued)

*Primary Examiner* — Hee K Song
(74) *Attorney, Agent, or Firm* — Kwan & Olynick LLP

(57) ABSTRACT

A plurality of permissions associated with the on-demand computing services environment may be identified. Each of the permissions may identify a respective one or more actions permitted to be performed within the on-demand computing services environment. Each of the permissions may be granted to a respective one or more user accounts within the on-demand computing services environment. A degree of overlap between a first group of the user accounts granted a first one of the permissions and a second group of the user accounts granted a second one of the permissions may be determined. When the degree of overlap exceeds a designated threshold, a designated permission set that includes the first permission and the second permission may be created.

20 Claims, 9 Drawing Sheets

Related U.S. Application Data continuation of application No. 16/681,932, filed on Nov. 13, 2019, now Pat. No. 11,425,130.

(51) Int. Cl.
  *G06N 7/01*  (2023.01)
  *G06N 20/00*  (2019.01)

(52) U.S. Cl.
  CPC .......... *H04L 63/101* (2013.01); *H04L 63/102* (2013.01)

(56)  References Cited

U.S. PATENT DOCUMENTS

| | | |
|---|---|---|
| 11,425,130 B2 | 8/2022 | Parks et al. |
| 2019/0068612 A1 | 2/2019 | Eads et al. |
| 2019/0188288 A1 | 6/2019 | Holm et al. |
| 2019/0190917 A1* | 6/2019 | Joe .......................... G06F 21/45 |
| 2021/0144144 A1 | 5/2021 | Parks et al. |
| 2022/0385666 A1 | 12/2022 | Parks et al. |

OTHER PUBLICATIONS

U.S. Appl. No. 17/812,977, USPTO e-Office Action: NOA—Corrected Notice Of Allowance And Fees Due (Ptol-85), Mar. 19, 2024, 7 pages.

U.S. Appl. No. 17/812,977, USPTO e-Office Action: NOA—Notice Of Allowance And Fees Due (Ptol-85), Feb. 7, 2024, 7 pages.

U.S. Appl. No. 16/681,932, Notice of Allowance mailed Apr. 18, 2022, 9 pgs.

\* cited by examiner

COMPUTING SYSTEM PERMISSION ADMINISTRATION ENGINE

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

FIELD OF TECHNOLOGY

This patent document relates generally to database system administration and more specifically to computing environment security.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Interaction with cloud computing environments and other computing services environments is performed via user accounts. Different user accounts can be assigned different permissions. Such permissions identify actions that user accounts are permitted to perform in relation to a computing services environment. As the number of users and the complexity of the environment increase, managing user permissions presents a range of technical challenges.

BRIEF DESCRIPTION OF THE DRAWINGS

The included drawings are for illustrative purposes and serve only to provide examples of possible structures and operations for the disclosed inventive systems, apparatus, methods and computer program products for computing systems permission management. These drawings in no way limit any changes in form and detail that may be made by one skilled in the art without departing from the spirit and scope of the disclosed implementations.

DETAILED DESCRIPTION

Figure 1:
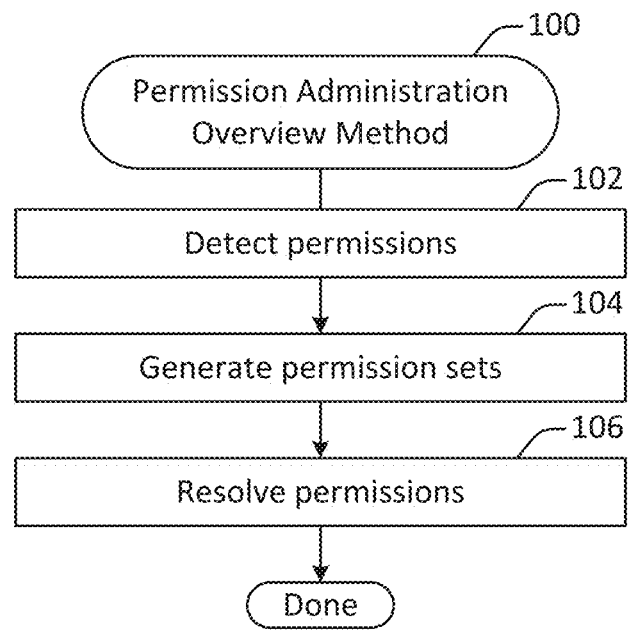
FIG. 1 illustrates an example of an overview method for permissions administration, performed in accordance with one or more embodiments.

According to various embodiments, enterprise computing systems support a variety of operations, depending on the computing context. Such operations may be performed by users and applications that are each authenticated to the system. Different user accounts and applications may be authorized to perform different types of actions. When a user or application transmits a request to take an action within the computing system, the system may first authenticate the user or application and then determine whether the user or application is authorized to perform the requested action.

Enterprise computing systems often evolve over time, and many systems are not built from the ground up to properly enforce permissions. Further, users and applications may be granted more permissions than necessary. For example, the role of a user or application may change to encompass different operations or responsibilities. However, the user or application may retain permissions associated with a previous role, despite no longer needing those permissions. Under the principle of least privilege, such residual permissions constitute a security risk, since ideally each user or application should possess only those permissions involved in executing the tasks assigned to the user or application.

According to various embodiments, techniques and mechanisms described herein provide for the automatic analysis and updating of permissions. User or application interactions with a system may be analyzed to identify a permission structure. The system may then update permissions for users in an automated fashion. Administrators may be notified and/or may approve permissions-related operations and information.

According to various embodiments, a user may refer to any authenticated account that has access to a computing system. Such an account may not have access to all areas of the system, but rather may be able to take actions that are limited based on one or more individual permissions, permission sets, and/or roles. As used herein the term administrator may refer to a user with permission to view, set, and/or update permissions, roles, and/or permission sets for other users.

In some implementations, a permission may refer to an authorization for performing a specific action within a computing system. A permission set may refer to a collection of permissions. As discussed herein, a permission set may be dynamically constructed based on, for instance, logged user activity. A role may also refer to a collection of permissions to which a user may be assigned. As discussed herein, a role may be defined by a system administrator or software creator, and may grant and/or deny permissions to users in that role.

According to various embodiments, techniques and mechanisms described herein may be used to ease the transition to enforcing a previously unenforced permission. For example, suppose that a system includes access to an operation such as viewing tags used to describe objects such as content and contacts within a marketing services system. Suppose also that the system has not in the past been configured to enforce permissions for the tag viewing operation, and further that many users who actively employ this operation have not been granted permission to perform the operation. Using conventional techniques, suddenly enforcing the permission would prevent legitimate access by large numbers of users. However, continuing to fail to enforce the permission would defeat the purpose of the permission.

According to various embodiments of techniques and mechanisms described herein, the permission may be enforced without disrupting access to the system. For example, user activity may be analyzed to determine which users actively employ the operation. Users may then be explicitly assigned the permission based at least in part on past activity within the system. Moving forward, users who have not employed the operation in the past would need to be granted the permission in order to perform the operation.

As an example of the application of one or more embodiments of techniques and mechanisms described herein, consider a hypothetical user, Alexandra. In this example, Alexandra is a systems administrator within an enterprise system who recently changed organizational roles to become a manager. However, as is frequently the case in such situations, Alexandra's permissions within the system were not updated to reflect her new organizational role. Although in her new role Alexandra still accesses the system to view reports, she no longer makes system changes, resets passwords, and performs other such operations that she did in her previous organizational role as a system administrator.

When conventional techniques are employed, Alexandra would continue to possess her preexisting permissions, thus violating the principle of least privilege, until and unless an administrator manually removed those permissions. According to various embodiments of techniques and mechanisms described herein, the system may automatically determine that Alexandra no longer uses her preexisting permissions. The system may then automatically, or based on administrator input, remove the permissions that Alexandra no longer needs. In so doing, the overall security risk associated with the system may be substantially reduced.

In some implementations, a machine learning algorithm may be used to group similar permissions. The system may then determine the permissions that a user is likely to used based on what has been logged. Permissions may be grouped into permission sets and roles, and users may be identified as being associated with permission sets and roles. For example, the system may generate a user-level score for each permission set and each role, and these scores may be used to suggest permissions that can be removed, for instance for users who are no longer actively using them.

FIG. 1 illustrates an example of an overview method 100 for permissions administration, performed in accordance with one or more embodiments. According to various embodiments, the method 100 may be performed at one or more computing devices within an on-demand computing services environment. For example, the method 100 may be performed at one or more of the devices discussed with respect to FIG. 7, FIG. 8A, FIG. 8B, and/or FIG. 9.

Permissions are detected at 102. According to various embodiments, permission detection may involve operations such as identifying permissions granted to a user, identifying permissions that are actively used by a user, identifying permissions that are granted but underutilized, identifying permissions that are granted and in active use, and/or identifying permissions that are have been requested but not yet granted. Permission detection may be used to aggregate information suitable for constructing profiles of users based on activity and permission sets. Additional details regarding the detection of permissions are discussed with respect to the method 200 shown in FIG. 2.

Permission sets are generated at 104. In some implementations, permission set generation may involve operations such as determining overlap between users in terms of permissions granted and used and grouping overlapping permission sets together. Dynamically generated permission sets may then be used to update user permissions. Additional details regarding the generation of permission sets are discussed with respect to the method 300 shown in FIG. 3.

Permissions are resolved at 106. According to various embodiments, resolving permissions may involve performing operations such as determining a permission set for a selected user. Additionally, one or more operations may be performed to notify a user such as an administrator of the change, and/or to elicit confirmation for the change. Additional details regarding the resolution of user permissions are discussed with respect to the method 600 shown in FIG. 6.

Figure 2:
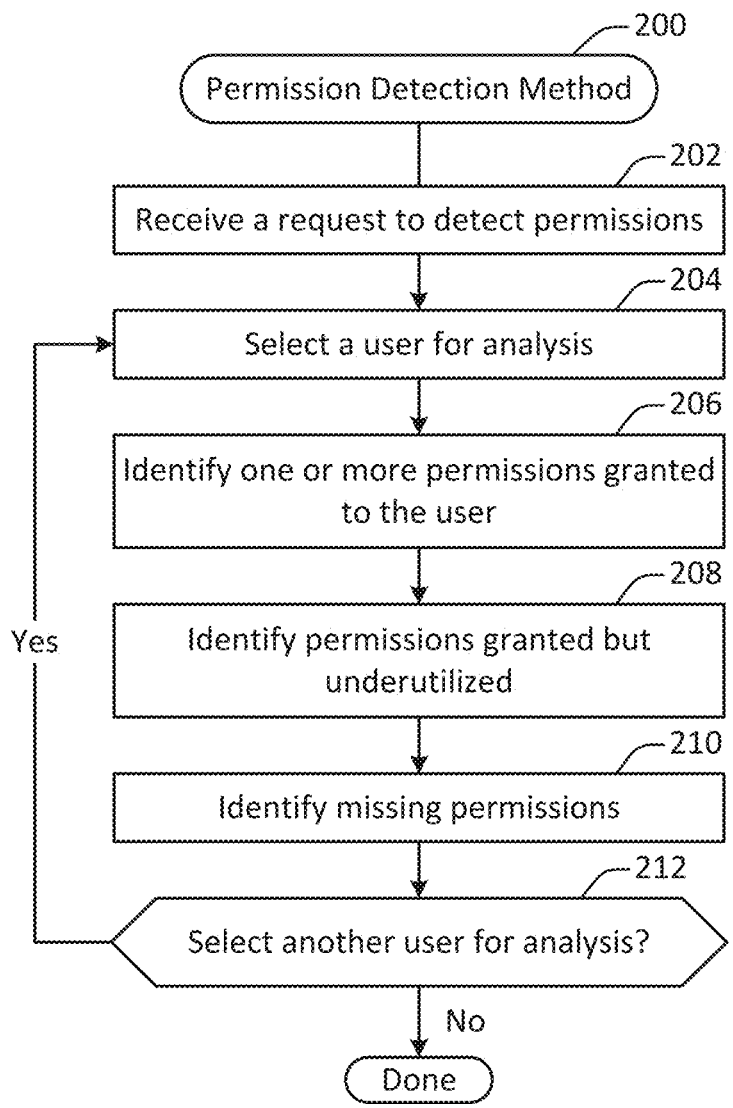
FIG. 2 illustrates an example of a method for detecting permissions, performed in accordance with one or more embodiments.

FIG. 2 illustrates an example of a method 200 for detecting permissions, performed in accordance with one or more embodiments. In some implementations, the method 200 may be performed at one or more components within an on-demand computing services environment. For example, one or more operations may be performed at a component discussed with respect to FIG. 7, FIG. 8A, FIG. 8B and/or FIG. 9.

A request to detect permissions is received at 202. In some implementations, permissions may be detected at least in part by analyzing user activity associated with a computing system. For example, user actions within the system may be logged and analyzed periodically. As another example, user actions within the system may be analyzed dynamically as they are performed.

A user is selected for analysis at 204. According to various embodiments, a user may be selected based on any suitable criteria. For example, users may be analyzed periodically. As another example, users may be analyzed based on the frequency with which they access the system.

One or more permissions granted to the user are identified at 206. In some implementations, the process for identifying granted user permissions may be system-specific. For example, one or more permissions may be stored in a database table. As another example, one or more permissions may be stored in a configuration file associated with the user. Each permission may identify a specific operation capable of being performed within the system, as well as whether the user is authorized to perform the operation. In some configurations, a permission may identify one or more conditions under which the user is authorized to perform the operation.

One or more permissions granted but underutilized are identified at 208. According to various embodiments, granted but underutilized permissions may include a subset of the permissions identified at 206. Granted but underutilized permissions may be identified by analyzing system logs to determine some measure of action utilization by the user. For instance, the system may determine an absolute count, a time-windowed count, and/or a frequency with which the user performs one or more of the actions associated with the permissions identified at 206. If the user performs the action at a level that falls beneath a designated threshold, then the permission for that action may be identified as underutilized for the selected user.

One or more missing permissions are identified at 210. According to various embodiments, various criteria may be used to identify a missing permission. For example, a user interface may include operations such as action or navigation buttons that are made visible even to users that do not have permission to perform those actions or navigate to those pages. If a user attempts to access such an operation within the user interface, the permission associated with the access attempt may be identified as missing. In some configurations, the user access attempts may need to exceed a designated count threshold and/or frequency to be identified as missing.

A determination is made at 212 as to whether to select another user for analysis. According to various embodiments, users may be analyzed sequentially or in any suitable order. Although FIG. 2 shows operations as being performed sequentially, in one or more implementations operations may be performed in parallel or in some other order. For example, more than one user may be analyzed in parallel. As another example, a given operation may be performed for many users at the same time.

In some implementations, one or more operations may be omitted from the procedure shown in FIG. 2. For example, granted permissions may be identified without necessarily identifying missing permissions. As another example, one or more users may not be associated with missing and/or underutilized permissions.

Figure 3:
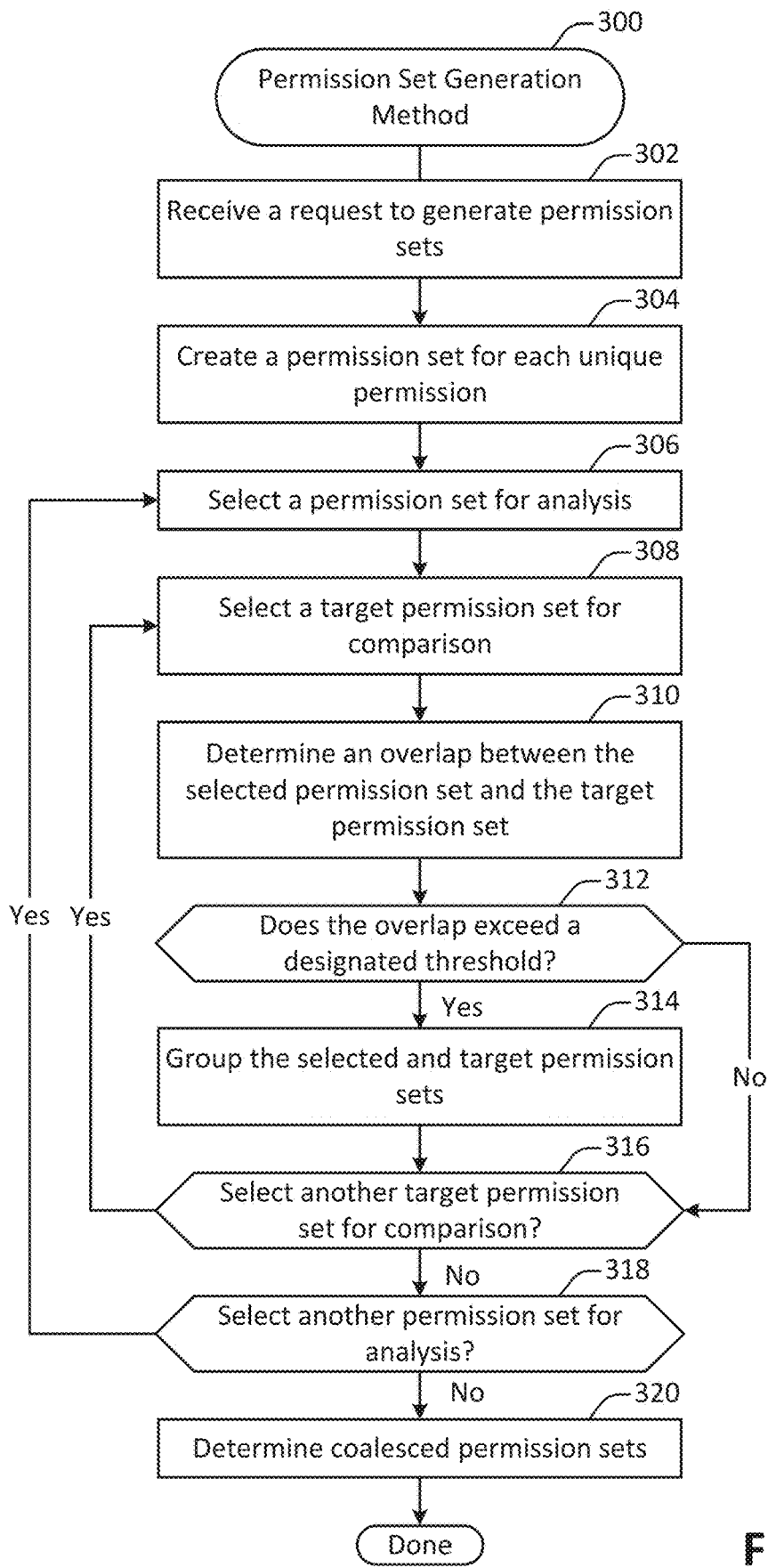
FIG. 3 illustrates an example of a method for generating permission sets, performed in accordance with one or more embodiments.

FIG. 3 illustrates an example of a method 300 for generating permission sets, performed in accordance with one or more embodiments. In some implementations, the method 300 may be performed at one or more components within an on-demand computing services environment. For example, one or more operations may be performed at a component discussed with respect to FIG. 7, FIG. 8A, FIG. 8B and/or FIG. 9.

In particular embodiments, the method 300 may implement a machine learning classification procedure. For example, a Naïve Bayes machine learning classification algorithm may be employed to generate permission sets from existing permissions data.

Figure 4:
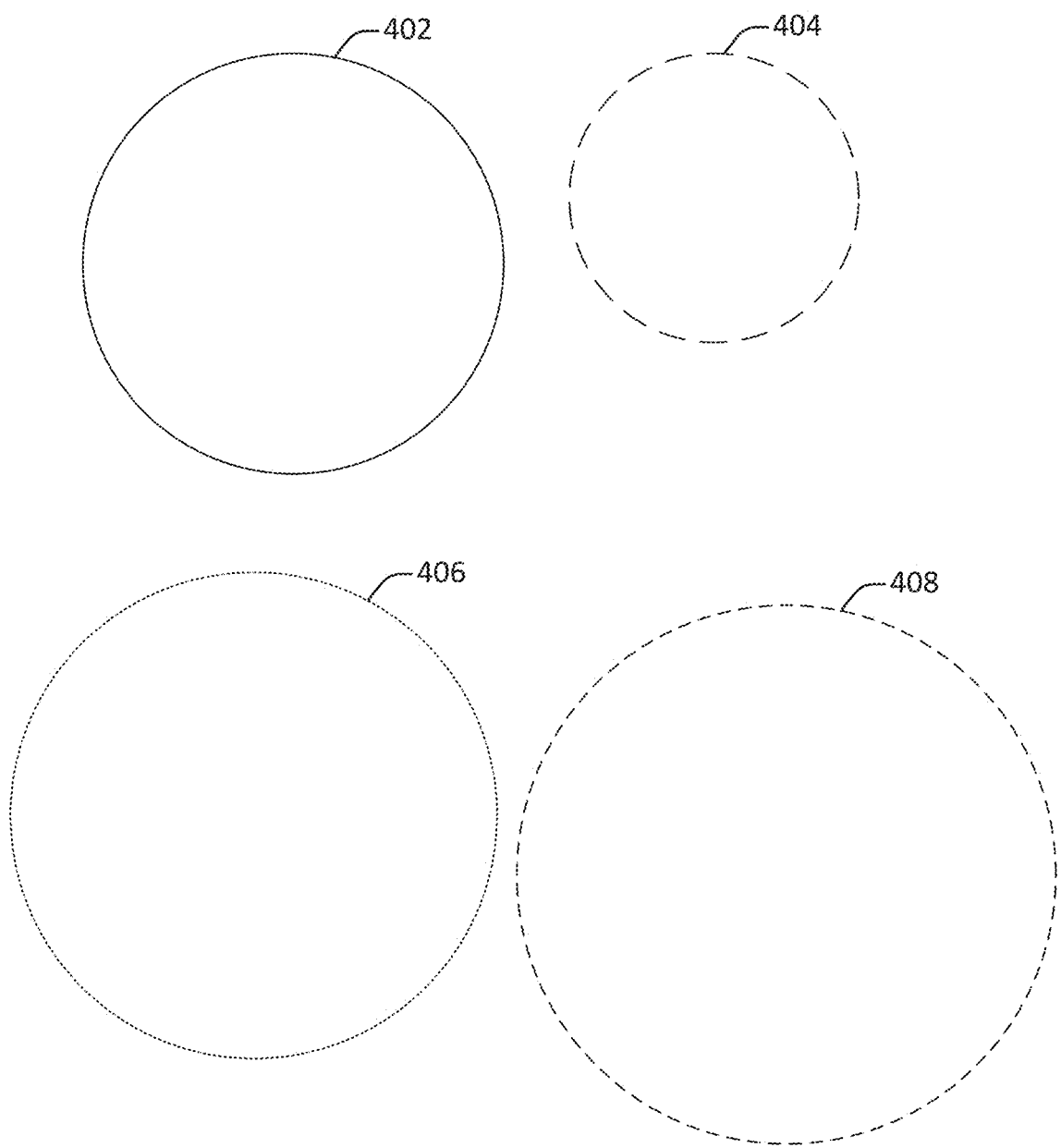
FIG. 4 illustrates an example of a configuration of permission sets, configured in accordance with one or more embodiments.
Figure 5:
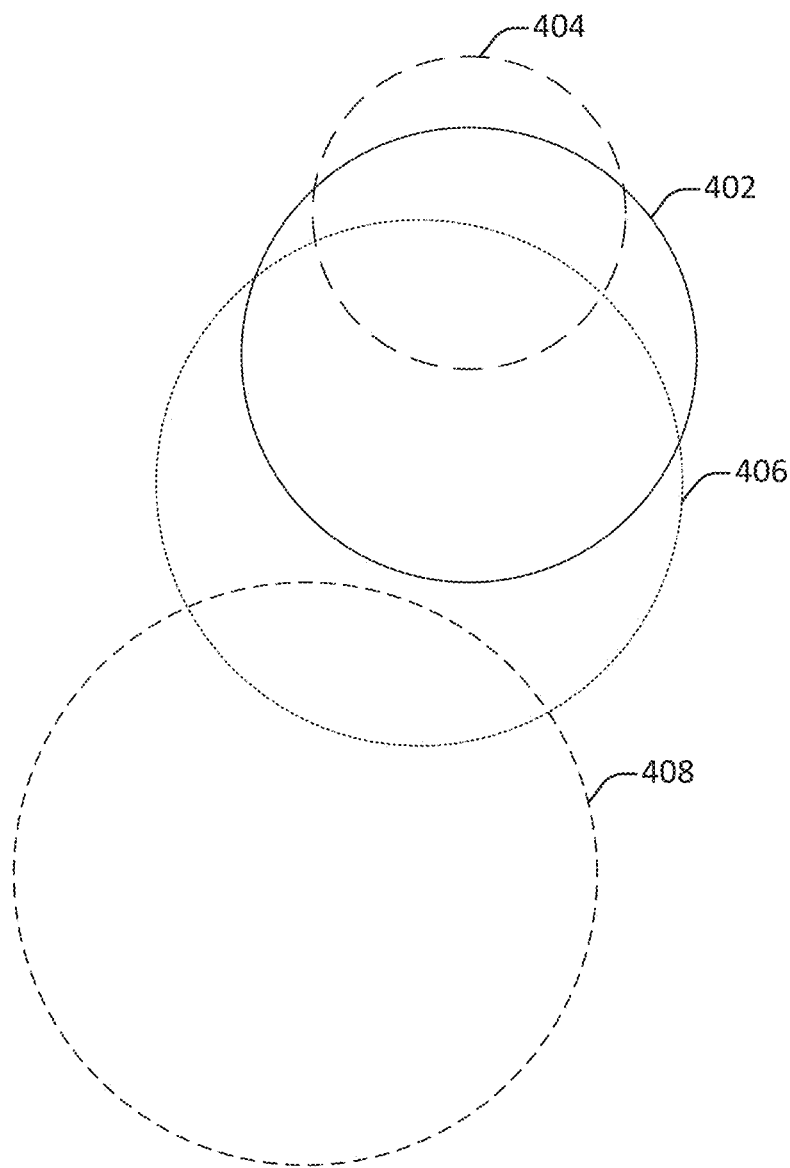
FIG. 5 illustrates an example of a configuration of permission sets, configured in accordance with one or more embodiments.

FIG. 3 is described partially in reference to FIG. 4 and FIG. 5. FIG. 4 illustrates an example of a configuration 400 of permission sets, while FIG. 5 illustrates an example of a configuration 500 of permission sets, arranged in accordance with one or more embodiments.

A request to generate permission sets is received at 302. In some implementations, the request may be generated based on any of a variety of suitable triggering criteria. For example, the request may be generated based on user input provided by a systems administrator. As another example, permission sets may be generated and analyzed periodically, such as once per day or once per week.

A permission set is created for each unique permission at 304. According to various embodiments, each permission set may include all users who have been granted the selected permission. Permission sets may be created at least in part by analyzing the permissions identified in the method 200 shown in FIG. 2.

The configuration 400 shown in FIG. 4 illustrates an abstract representation of a simple system that includes four different permissions. In the configuration 400, each circle corresponds to a permission set, with the size of the permission set being proportional to the number of users in the permission set. Thus, the configuration 400 includes the permission sets 402, 404, 406, and 408.

In particular embodiments, one or more permissions may be omitted from the permission sets created 304. For instance, a system may include a blacklist of permissions that are not to be automatically adjusted and/or analyzed. Such permissions may include, but are not limited to, permissions associated with heightened security concerns. For example, the system may include on the blacklist a permission to change user permissions, a permission to access sensitive user data, a permission to create or delete users, or other such permissions. As another example, a permission allowing a user to assign or revoke encryption keys may be deemed too dangerous to allow for auto-updating.

A permission set is selected for analysis at 306, and a target permission set is selected for analysis at 308. According to various embodiments, selected permission sets and target permission sets may be analyzed in any suitable order, such as in parallel or at random.

An overlap between the selected permission set and the target permission set is determined at 310. According to various embodiments, the overlap may identify the users that have been assigned both the selected permission and the target permission. For example, in the configuration 400 shown in FIG. 4, most of the users who have the permission corresponding with the permission set 404 have also received the permission corresponding with the permission set 402. Accordingly, when analyzing the permission set 404 in comparison with the target permission set 402, the overlap would include a majority of all users who received the permission 404.

A determination is made at 312 as to whether the overlap exceeds a designated threshold. According to various embodiments, the designated threshold may be strategically determined based on any of a number of considerations. For instance, a lower threshold may result in a more simplified system with a smaller number of permission sets, while a higher threshold may result in a more granular system with a greater number of permission sets.

In some implementations, the designated threshold may change during the operation of the procedure 300. For example, the method 300 may be performed iteratively so that permissions are selected for analysis more than once. In such a configuration, the designated threshold may be increased if, for instance, earlier iterations resulted in a relatively large number of grouped permission sets relative to the initial number of permission sets.

In some implementations, the designated threshold may change the number of permission sets generated. For the purpose of illustration, consider the example discussed with respect to FIGS. 4 and 5. At one extreme, in this example if the permission overlap were set to 100%, then four distinct permission sets would be generated. At the other extreme, if in this example the permission overlap were set to 0% then only one permission set would be generated since the degree of overlap would not affect the grouping process.

According to various embodiments, the actual value may be set in any of a number of ways. For example, an administrator could manually set a designated threshold at, for example, 80%. Such a threshold may be manually adjusted based on factors such as, for instance, the number of permission sets generated based on a previous iteration of the procedure.

In some implementations, the designated threshold may be adjusted to achieve a designated number of permission sets. For instance, two permission sets might correspond to "Administrator" and "User" roles, while three permission sets might correspond to "Administrator", "Super User", and "User" roles. In such a configuration, the system may apply an evolutionary computing procedure to iteratively vary the designated threshold until the designated number of permission sets is reached. The specific number of permissions sets may be strategically determined based on the specific context being analyzed. In the example discussed with respect to FIGS. 4 and 5, an evolutionary computing approach targeting three permission sets may create a permission set A from 404 and 402, a permission set B from 402 and 406, and then a permission set C from either 408 by itself or 408 and 406.

At 314, the selected and target permission sets are grouped. According to various embodiments, grouping the selected and target permission sets may be accomplished by updating the selected permission set to include users in the second permission set. For example, in FIG. 5, the permission set 402 may be updated to include the users in the permission sets 404 and 406 because the permission set 402 overlaps considerably with the permission sets 404 and 406. As another example, the permission set 404 may be updated to include the users in the permission set 402 because the permission set 404 overlaps considerably with the permission set 402. As still another example, the permission set 406 may be updated to include the users in the permission sets 408 and 402 because the permission set 406 overlaps significantly with the permission sets 408 and 402. As yet another example, the permission set 408 may be updated to include the users in the permission set 406 because the permission set 408 overlaps significantly with the permission set 406.

A determination is made at 316 as to whether to select another target permission set for comparison. According to various embodiments, each available permission set may be selected until all have been compared with the permission set selected at operation 306.

A determination is made at 318 as to whether to select another permission set for analysis. In some implementations, permission sets may be selected for analysis until all available permission sets have been analyzed.

In some implementations, the determinations made at 316 and 318 may be made so that permission sets are analyzed after having been grouped together. For example, a grouped permission set created at 314 may then be treated as a new permission set, and selected at 306 for analysis by comparing it with other original or grouped permission sets.

Although operations are shown in FIG. 3 as being performed in sequence, in some implementations one or more operations may be performed in parallel. For example, different permission sets may be analyzed in parallel.

One or more coalesced permission sets are determined at 320. According to various embodiments, the coalesced permission sets may be determined based on the grouped permission sets determined at 314. Determining the coalesced permission sets may involve eliminating duplicate or very similar subsets of permissions.

For example, in FIG. 4, the permission set corresponding to 402 was expanded as discussed at 320 to include users in the permission sets 404 and 406. Similarly, the permission set corresponding to 404 was expanded to include users in the permission set 402. Because the permission set defined as the union of the 402, 404, and 406 permission sets includes the permission set defined as the union of the 402 and 404 permission sets, the second permission set may be eliminated.

As another example, in FIG. 4, the permission set corresponding to 406 was expanded as discussed at 320 to include users in the permission sets 402 and 408. Similarly, the permission set corresponding to 408 was expanded to include users in the permission set 406. Because the permission set defined as the union of the 402, 406, and 408 permission sets includes the permission set defined as the union of the 406 and 408 permission sets, the second permission set may be eliminated.

According to various embodiments, the coalesced permission sets may constitute a set of automatically generated permission sets that are fewer in number than the total number of permissions on the system. For instance, in the simplified example shown in FIGS. 4 and 5, the four initial permissions are reduced to two permission sets, the first including users having been assigned permissions corresponding to any of the original permission sets 402, 404, and 406, and the second including users having been assigned permissions corresponding to any of the original permission sets 402, 406, and 408.

Figure 6:
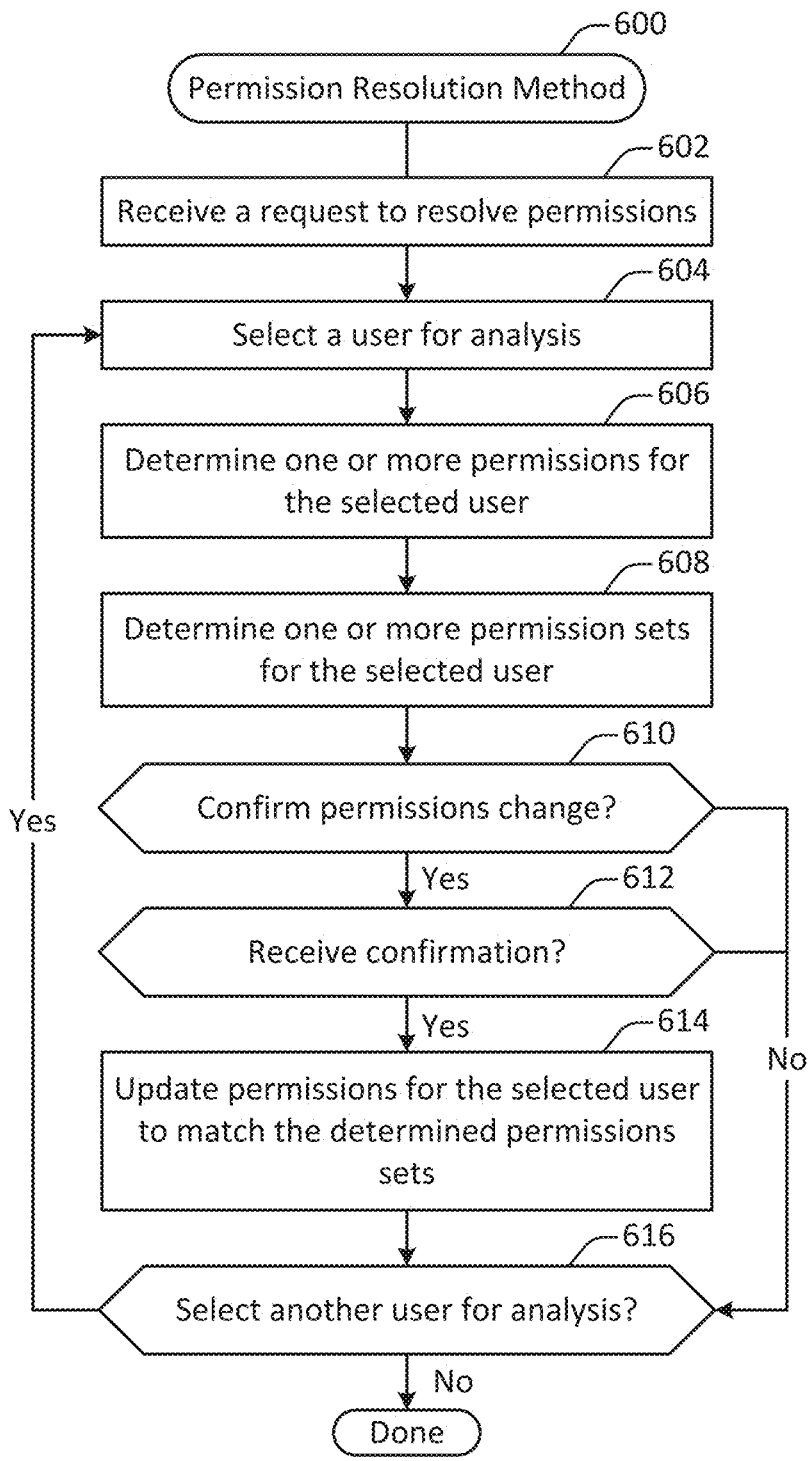
FIG. 6 illustrates an example of a method for resolving permissions, performed in accordance with one or more embodiments.

FIG. 6 illustrates an example of a method 600 for resolving permissions, performed in accordance with one or more embodiments. In some implementations, the method 600 may be performed at one or more components within an on-demand computing services environment. For example, one or more operations may be performed at a component discussed with respect to FIG. 7, FIG. 8A, FIG. 8B and/or FIG. 9.

A request to resolve permissions is received at 302. In some implementations, the request may be generated based on any of a variety of suitable triggering criteria. For example, the request may be generated based on user input provided by a systems administrator. As another example, permissions may be resolved periodically, such as once per day or once per week. As still another example, permissions may be resolved automatically after permission sets are determined as discussed with respect to the method 200 shown in FIG. 2.

A user is selected for analysis at 604. According to various embodiments, a user may be selected based on any suitable criteria. For example, users may be analyzed periodically. As another example, users may be analyzed based on the frequency with which they access the system.

One or more permissions for the selected user are determined at 606. According to various embodiments, the one or more permissions may be determined at least in part based on the user's permissions as determined with respect to the permission detection method 200 discussed with respect to FIG. 2. For example, a user's underutilized permissions may be subtracted from the user's granted permissions to determine a baseline set of permissions to which the user is entitled.

One or more permission sets for the selected user are determined at 608. According to various embodiments, the permission sets may be determined based on evaluating which of the coalesced permission sets determined at 320 are suitable for resolving the user's permissions determined as discussed with respect to the operation 606.

In some implementations, one or more permission sets for a user may be determined based at least in part on the principle of least privilege. Under this principle, a user may be assigned to the most restrictive one or more permissions necessary to grant the user the permissions identified at 606.

For instance, in the example discussed with respect to FIGS. 4 and 5, two coalesced permissions sets were identified, the first including the permissions corresponding to sets 402, 404, and 406, and the second including the permissions corresponding to sets 404, 406, and 408. In this example, a user assigned the permission 404 would be added to the first permission set, while a user assigned the permission 408 would be added to the second permission set, and a user assigned both permissions 404 and 408 would be added to both permission sets. Because both of the permission sets include the permissions corresponding to sets 402 and 406, a user having one of these permissions can be added to either set.

In some implementations, the determination of permissions and permission sets for the selected user at 606 and 608 may be interactive operations. For instance, the permissions granted to a user may affect the user's permissions groups, which may in turn affect the user's permissions. Such determinations may be made successfully until, for example, a user's permissions and permission groups are stable.

For example, if the selected user has been granted an underutilized permission as determined at operation 208, then the permission may be removed if the permission is generally lacking from other users within the selected user's permission set or sets. However, the permission may be retained if the underutilized permission has been assigned to most other users within the selected user's permission set or sets. As another example, if the selected user has a missing permission as identified at 210, then whether the selected user is granted the missing permission may depend on whether the missing permission is commonly granted to other users sharing a permissions group as the selected user.

A determination is made at 610 as to whether to confirm a permissions change for the selected user. If so, then a determination is made at 612 as to whether confirmation has been received. In some embodiments, confirmation may require an explicit action to be performed by the recipient of a confirmation message. For instance, an administrator may need to click a button within a user interface. Alternately, confirmation may involve passively notifying one or more users. For instance, when a user's permissions are changed, one or more administrators may receive a message notifying the administrators of the change.

According to various embodiments, confirmation may be required for some or all permissions changes. For example, confirmation may be required when an automated procedure determines that a user should be granted a significant number of additional permissions. As another example, confirmation may be required when an automated procedure determines that a user should be granted a permission associated with heightened security concerns. As still another example, confirmation may be required for all permissions elevations.

In particular embodiments, different permissions changes may be associated with different confirmation requirements. For instance, permissions may be ranked by security risk in increasing order depending on whether a permission allows a user to retrieve, create, update, or delete records from a database system. Each level of permission may be associated with a different level of confirmation requirement. Successive levels of confirmation requirement may include, but are not limited to: notification not required, confirmation not required, notifying a supervisor, notifying a system administrator, confirmation by a supervisor, and confirmation by a systems administrator. For example, a change to a less sensitive permission may require the approval of a user's supervisor, while a change to a more sensitive permission may require the approval of a systems administrator. As another example, the addition of a permission common to other users with similar permission may require that an administrator be notified, while the addition of a high-security permission may require that an administrator confirm the addition.

In some implementations, confirmation may be elicited by transmitting an email or a message within a communications interface. For example, an administrator may periodically review the result of automatic permission resolution to determine whether to approve the updated permissions.

The permissions for the selected user are updated at 614 to match the determined permission sets. For example, if a user has not yet been granted a designated permission that is included within a permission set in which the user is a member, the user may be granted the designated permission. As another example, if a user has been granted a permission that is not included within a permission set in which the user is a member, the permission may be revoked.

In particular embodiments, a permission may be "softly" revoked. For instance, a permission that is relatively under-utilized by a user may be assigned a low score. Such a permission may then be flagged for later removal. If the permission continues to go unused, at a later date it may be removed. However, if the permission is later used, then the action may be allowed and the score increased. In either case, an administrator may be notified to review the permission.

A determination is made at 616 as to whether to select another user for analysis. According to various embodiments, users may be analyzed sequentially or in any suitable order. Although FIG. 6 shows operations as being performed sequentially, in one or more implementations operations may be performed in parallel or in some other order. For example, more than one user may be analyzed in parallel. As another example, a given operation may be performed for many users at the same time.

Figure 7:
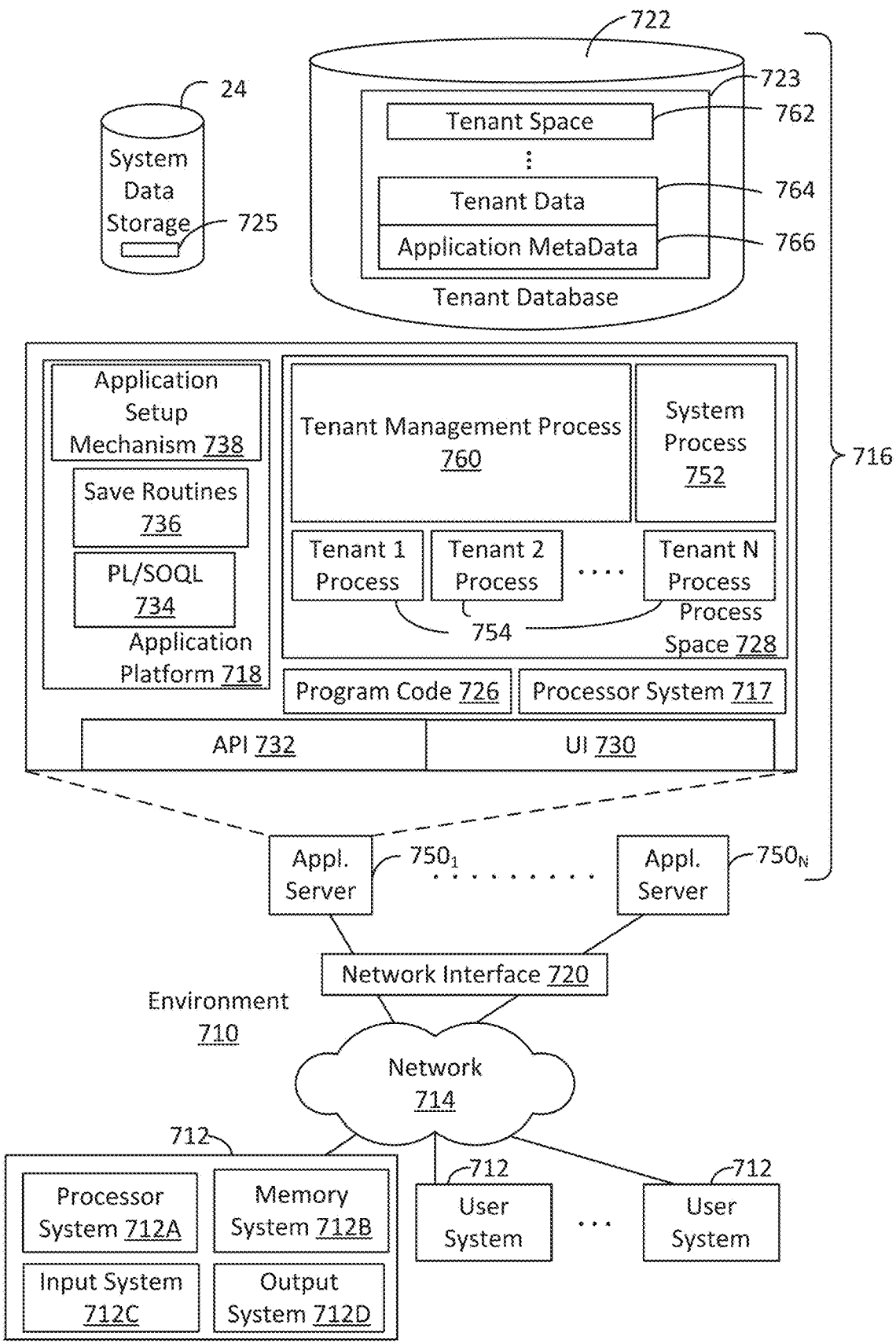
FIG. 7 shows a block diagram of an example of an environment that includes an on-demand database service configured in accordance with some implementations.

In some implementations, one or more operations may be omitted from the procedure shown in FIG. 6. For example, one or more permissions may be updated without requiring confirmation. Such permissions may include, but are not limited to, low-level permissions FIG. 7 shows a block diagram of an example of an environment 710 that includes an on-demand database service configured in accordance with some implementations. Environment 710 may include user systems 712, network 714, database system 716, processor system 717, application platform 718, network interface 720, tenant data storage 722, tenant data 723, system data storage 724, system data 725, program code 726, process space 728, User Interface (UI) 730, Application Program Interface (API) 732, PL/SOQL 734, save routines 736, application setup mechanism 738, application servers 750-1 through 750-N, system process space 752, tenant process spaces 754, tenant management process space 760, tenant storage space 762, user storage 764, and application metadata 766. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 716, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 716. Such applications may be developed by the database service provider or by users or third-party application developers accessing the service. Application platform 718 includes an application setup mechanism 738 that supports application developers' creation and management of applications, which may be saved as metadata into tenant data storage 722 by save routines 736 for execution by subscribers as one or more tenant process spaces 754 managed by tenant management process 760 for example. Invocations to such applications may be coded using PL/SOQL 734 that provides a programming language style interface extension to API 732. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 766 for a subscriber making such an invocation. Such system processes may also manage execution of application metadata 766 as an application in a virtual machine.

In some implementations, each application server 750 may handle requests for any user associated with any organization. A load balancing function (e.g., an F5 Big-IP load balancer) may distribute requests to the application servers 750 based on an algorithm such as least-connections, round robin, observed response time, etc. Each application server 750 may be configured to communicate with tenant data storage 722 and the tenant data 723 therein, and system data storage 724 and the system data 725 therein to serve requests of user systems 712. The tenant data 723 may be divided into individual tenant storage spaces 762, which can be either a physical arrangement and/or a logical arrangement of data. Within each tenant storage space 762, user storage 764 and application metadata 766 may be similarly allocated for each user. For example, a copy of a user's most recently used (MRU) items might be stored to user storage 764. Similarly, a copy of MRU items for an entire tenant organization may be stored to tenant storage space 762. A UI 730 provides a user interface and an API 732 provides an application programming interface to system 716 resident processes to users and/or developers at user systems 712.

System 716 may implement a web-based permissions management system. For example, in some implementations, system 716 may include application servers configured to implement and execute permissions analytics software applications. The application servers may be configured to provide related data, code, forms, web pages and other information to and from user systems 712. Additionally, the application servers may be configured to store information to, and retrieve information from a database system. Such information may include related data, objects, and/or Webpage content. With a multi-tenant system, data for multiple tenants may be stored in the same physical database object in tenant data storage 722, however, tenant data may be arranged in the storage medium(s) of tenant data storage 722 so that data of one tenant is kept logically separate from that of other tenants. In such a scheme, one tenant may not access another tenant's data, unless such data is expressly shared.

Several elements in the system shown in FIG. 7 include conventional, well-known elements that are explained only briefly here. For example, user system 712 may include processor system 712A, memory system 712B, input system 712C, and output system 712D. A user system 712 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 712 to access, process and view information, pages and applications available from system 716 over network 714. Network 714 may be any network or combination of networks of devices that communicate with one another, such as any one or any combination of a LAN (local area network), WAN (wide area network), wireless network, or other appropriate configuration.

The users of user systems 712 may differ in their respective capacities, and the capacity of a particular user system 712 to access information may be determined at least in part by "permissions" of the particular user system 712. As discussed herein, permissions generally govern access to computing resources such as data objects, components, and other entities of a computing system, such as a social networking system and/or a CRM database system. "Permission sets" generally refer to groups of permissions that may be assigned to users of such a computing environment. For instance, the assignments of users and permission sets may be stored in one or more databases of System 716. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users.

Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 716 may provide on-demand database service to user systems 712 using an MTS arrangement. By way of example, one tenant organization may be a company that employs a sales force where each salesperson uses system 716 to manage their sales process. Thus, a user in such an organization may maintain contact data, leads data, customer follow-up data, performance data, goals and progress data, etc., all applicable to that user's personal sales process (e.g., in tenant data storage 722). In this arrangement, a user may manage his or her sales efforts and cycles from a variety of devices, since relevant data and applications to interact with (e.g., access, view, modify, report, transmit, calculate, etc.) such data may be maintained and accessed by any user system 712 having network access.

When implemented in an MTS arrangement, system 716 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 716 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 716 may also maintain system-level data usable by multiple tenants or other data. Such system-level data may include industry reports, news, postings, and the like that are sharable between tenant organizations.

In some implementations, user systems 712 may be client systems communicating with application servers 750 to request and update system-level and tenant-level data from system 716. By way of example, user systems 712 may send one or more queries requesting data of a database maintained in tenant data storage 722 and/or system data storage 724. An application server 750 of system 716 may automatically generate one or more SQL statements (e.g., one or more SQL queries) that are designed to access the requested data. System data storage 724 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 8A:
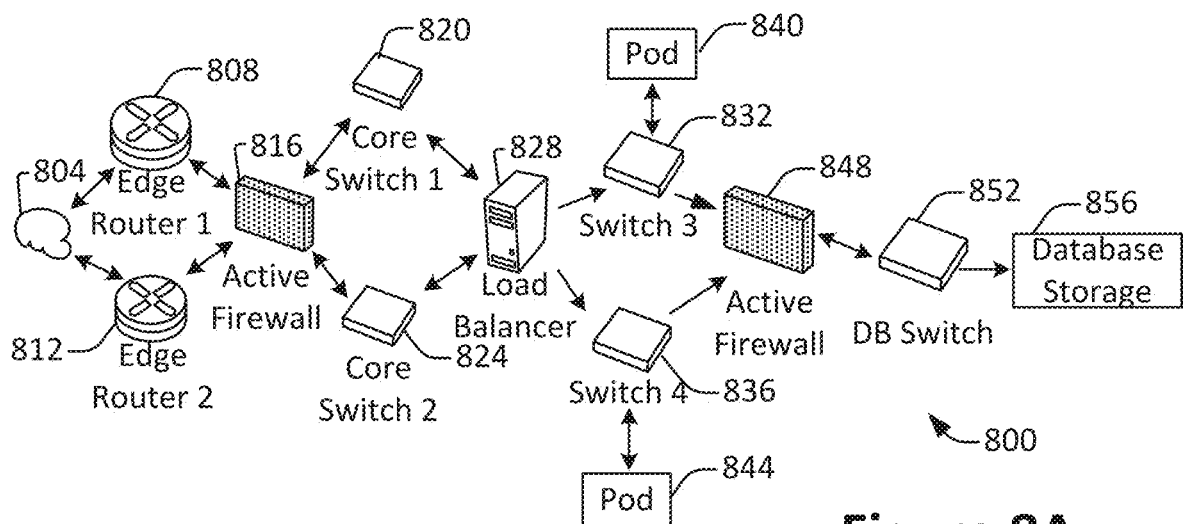
FIG. 8A shows a system diagram of an example of architectural components of an on-demand database service environment, configured in accordance with some implementations.

FIG. 8A shows a system diagram of an example of architectural components of an on-demand database service environment 800, configured in accordance with some implementations. A client machine located in the cloud 804 may communicate with the on-demand database service environment via one or more edge routers 808 and 812. A client machine may include any of the examples of user systems ?12 described above. The edge routers 808 and 812 may communicate with one or more core switches 820 and 824 via firewall 816. The core switches may communicate with a load balancer 828, which may distribute server load over different pods, such as the pods 840 and 844 by communication via pod switches 832 and 836. The pods 840 and 844, which may each include one or more servers and/or other computing resources, may perform data processing and other operations used to provide on-demand services. Components of the environment may communicate with a database storage 856 via a database firewall 848 and a database switch 852.

Accessing an on-demand database service environment may involve communications transmitted among a variety of different components. The environment 800 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 8A and 8B.

The cloud 804 refers to any suitable data network or combination of data networks, which may include the Internet. Client machines located in the cloud 804 may communicate with the on-demand database service environment 800 to access services provided by the on-demand database service environment 800. By way of example, client machines may access the on-demand database service environment 800 to retrieve, store, edit, and/or process permissions information.

In some implementations, the edge routers 808 and 812 route packets between the cloud 804 and other components of the on-demand database service environment 800. The edge routers 808 and 812 may employ the Border Gateway Protocol (BGP). The edge routers 808 and 812 may maintain a table of IP networks or 'prefixes', which designate network reachability among autonomous systems on the internet.

In one or more implementations, the firewall 816 may protect the inner components of the environment 800 from internet traffic. The firewall 816 may block, permit, or deny access to the inner components of the on-demand database service environment 800 based upon a set of rules and/or other criteria. The firewall 816 may act as one or more of a packet filter, an application gateway, a stateful filter, a proxy server, or any other type of firewall.

In some implementations, the core switches 820 and 824 may be high-capacity switches that transfer packets within the environment 800. The core switches 820 and 824 may be configured as network bridges that quickly route data between different components within the on-demand database service environment. The use of two or more core switches 820 and 824 may provide redundancy and/or reduced latency.

In some implementations, communication between the pods 840 and 844 may be conducted via the pod switches 832 and 836. The pod switches 832 and 836 may facilitate communication between the pods 840 and 844 and client machines, for example via core switches 820 and 824. Also or alternatively, the pod switches 832 and 836 may facilitate communication between the pods 840 and 844 and the database storage 856. The load balancer 828 may distribute workload between the pods, which may assist in improving the use of resources, increasing throughput, reducing response times, and/or reducing overhead. The load balancer 828 may include multilayer switches to analyze and forward traffic.

In some implementations, access to the database storage 856 may be guarded by a database firewall 848, which may act as a computer application firewall operating at the database application layer of a protocol stack. The database firewall 848 may protect the database storage 856 from application attacks such as structure query language (SQL) injection, database rootkits, and unauthorized information disclosure. The database firewall 848 may include a host using one or more forms of reverse proxy services to proxy traffic before passing it to a gateway router and/or may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some implementations, the database storage 856 may be an on-demand database system shared by many different organizations. The on-demand database service may employ a single-tenant approach, a multi-tenant approach, a virtualized approach, or any other type of database approach. Communication with the database storage 856 may be conducted via the database switch 852. The database storage 856 may include various software components for handling database queries. Accordingly, the database switch 852 may direct database queries transmitted by other components of the environment (e.g., the pods 840 and 844) to the correct components within the database storage 856.

Figure 8B:
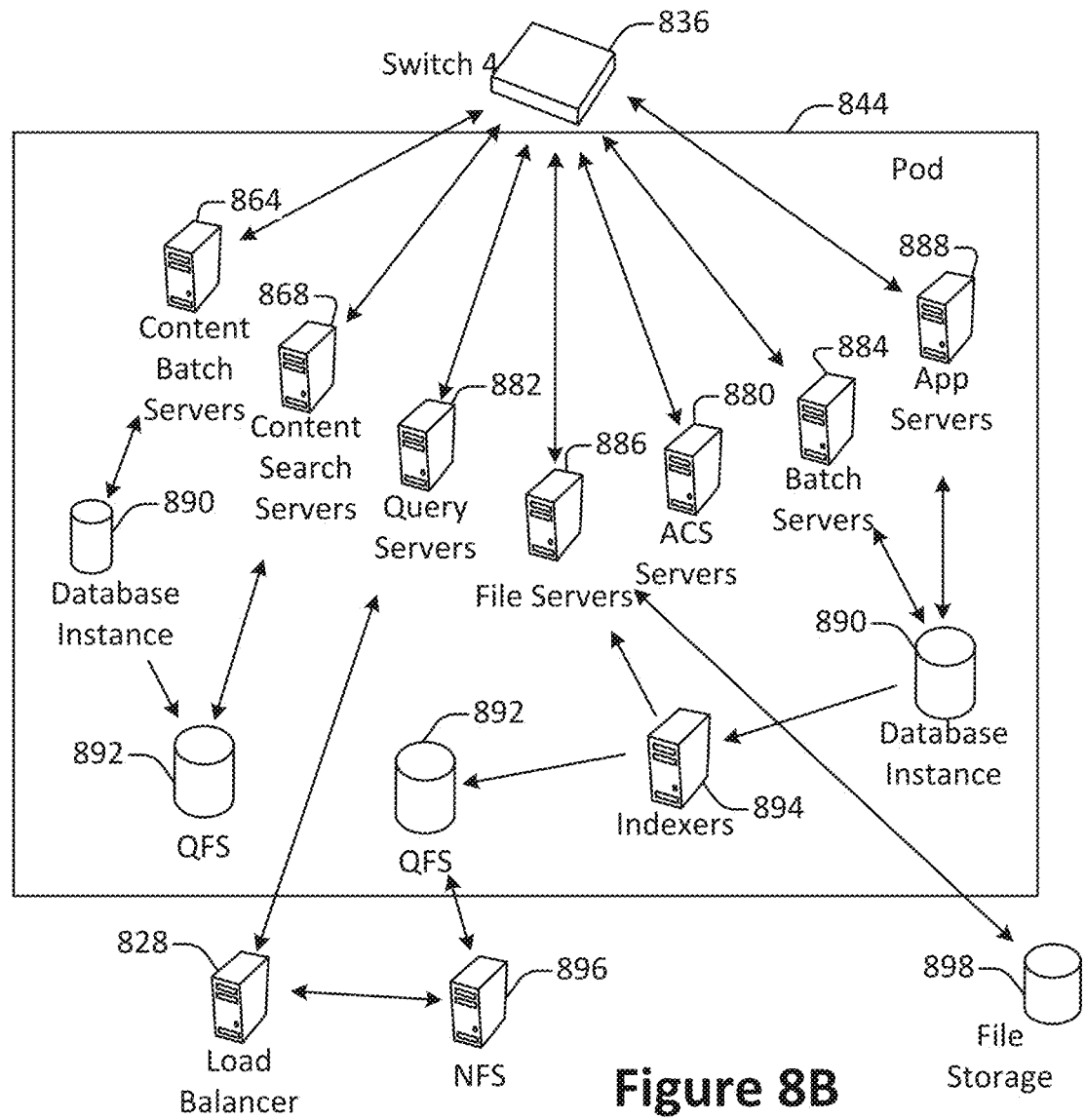
FIG. 8B shows a system diagram further illustrating an example of architectural components of an on-demand database service environment, in accordance with some implementations.

FIG. 8B shows a system diagram further illustrating an example of architectural components of an on-demand database service environment, in accordance with some implementations. The pod 844 may be used to render services to user(s) of the on-demand database service environment 800. The pod 844 may include one or more content batch servers 864, content search servers 868, query servers 882, file servers 886, access control system (ACS) servers 880, batch servers 884, and app servers 888. Also, the pod 844 may include database instances 890, quick file systems (QFS) 892, and indexers 894. Some or all communication between the servers in the pod 844 may be transmitted via the switch 836.

In some implementations, the app servers 888 may include a framework dedicated to the execution of procedures (e.g., programs, routines, scripts) for supporting the construction of applications provided by the on-demand database service environment 800 via the pod 844. One or more instances of the app server 888 may be configured to execute all or a portion of the operations of the services described herein.

In some implementations, as discussed above, the pod 844 may include one or more database instances 890. A database instance 890 may be configured as an MTS in which different organizations share access to the same database, using the techniques described above. Database information may be transmitted to the indexer 894, which may provide an index of information available in the database 890 to file servers 886. The QFS 892 or other suitable filesystem may serve as a rapid-access file system for storing and accessing information available within the pod 844. The QFS 892 may support volume management capabilities, allowing many disks to be grouped together into a file system. The QFS 892 may communicate with the database instances 890, content search servers 868 and/or indexers 894 to identify, retrieve, move, and/or update data stored in the network file systems (NFS) 896 and/or other storage systems.

In some implementations, one or more query servers 882 may communicate with the NFS 896 to retrieve and/or update information stored outside of the pod 844. The NFS 896 may allow servers located in the pod 844 to access information over a network in a manner similar to how local storage is accessed. Queries from the query servers 822 may be transmitted to the NFS 896 via the load balancer 828, which may distribute resource requests over various resources available in the on-demand database service environment 800. The NFS 896 may also communicate with the QFS 892 to update the information stored on the NFS 896 and/or to provide information to the QFS 892 for use by servers located within the pod 844.

In some implementations, the content batch servers 864 may handle requests internal to the pod 844. These requests may be long-running and/or not tied to a particular customer, such as requests related to log mining, cleanup work, and maintenance tasks. The content search servers 868 may provide query and indexer functions such as functions allowing users to search through content stored in the on-demand database service environment 800. The file servers 886 may manage requests for information stored in the file storage 898, which may store information such as documents, images, basic large objects (BLOBs), etc. The query servers 882 may be used to retrieve information from one or more file systems. For example, the query system 882 may receive requests for information from the app servers 888 and then transmit information queries to the NFS 896 located outside the pod 844. The ACS servers 880 may control access to data, hardware resources, or software resources called upon to render services provided by the pod 844. The batch servers 884 may process batch jobs, which are used to run tasks at specified times. Thus, the batch servers 884 may transmit instructions to other servers, such as the app servers 888, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 9:
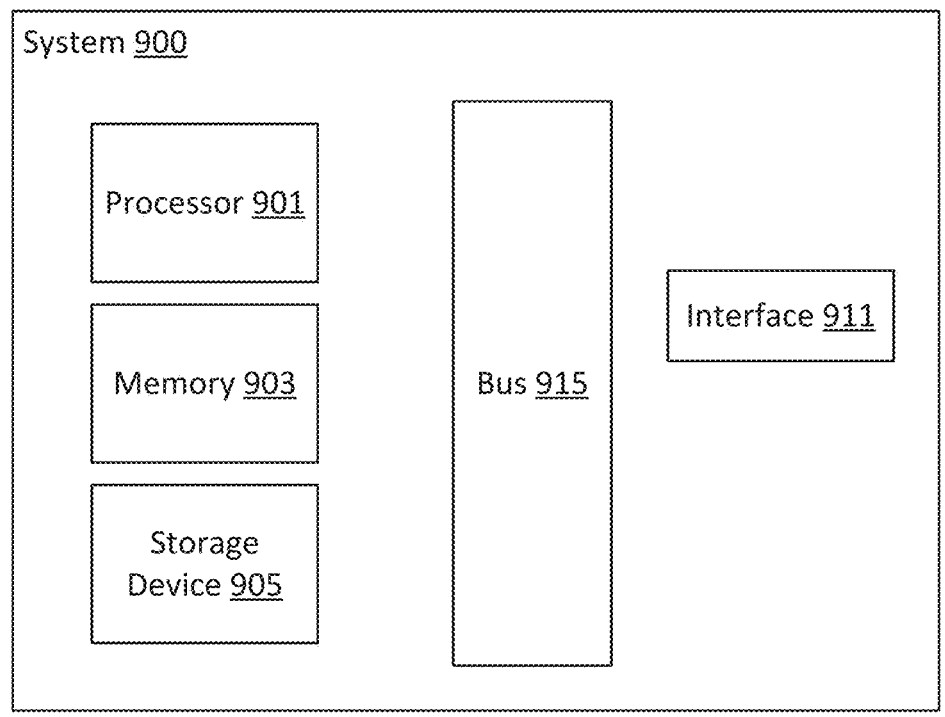
FIG. 9 illustrates one example of a computing device, configured in accordance with one or more embodiments.

FIG. 9 illustrates one example of a computing device. According to various embodiments, a system 900 suitable for implementing embodiments described herein includes a processor 901, a memory module 903, a storage device 905, an interface 911, and a bus 915 (e.g., a PCI bus or other interconnection fabric.) System 900 may operate as variety of devices such as an application server, a database server, or any other device or service described herein. Although a particular configuration is described, a variety of alternative configurations are possible. The processor 901 may perform operations such as those described herein. Instructions for performing such operations may be embodied in the memory 903, on one or more non-transitory computer readable media, or on some other storage device. Various specially configured devices can also be used in place of or in addition to the processor 901. The interface 911 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method implemented across multi-cloud environments, the method comprising:
    granting, via an authorization system to one or more user accounts associated with a first one of the environments, one or more permissions of a plurality of permissions associated with the multi-cloud environments, each of the plurality of permissions corresponding to a respective one or more of a plurality of actions permitted to be performed on resources;
    continuously monitoring use of the one or more permissions by the one or more user accounts;
    detecting, based on the continuous monitoring and a machine learning procedure, one or more atypical permission usages by the one or more user accounts;
    in response to detecting the atypical permission usages, creating a notification associated with the detected atypical permission usages; and providing, to an entity associated with the first environment, the notification in association with permissions management tools configurable to modify or revoke the one or more permissions for the one or more user accounts based on the alert.

2. The method of claim 1, wherein the user accounts comprise identities and the authorization system comprises a system that grants access to the identities.

3. The method of claim 1, further comprising:
    generating, based on detecting the atypical permission usage, a forensic report detailing the atypical permission usage.

4. The method of claim 1, further comprising:
    based on prior activity log information, classifying, and determining typical behavior for the one or more user accounts.

5. The method of claim 4, further comprising:
    providing, to the entity, a selection configurable to allow the entity to choose from pre-configured alerts to be sent to the entity in response to atypical or suspicious activity in the first environment.

6. The method of claim 5, further comprising:
notifying, based on preconfigured alerts selected by the entity, that an account has performed an unusual number of tasks.

7. The method of claim 6, further comprising:
automatically populating new permissions associated with a new role, based on historical activity of users selected by the entity.

8. A permissions management system implemented using a server system comprising one or more hardware processors, the permissions management system configurable to cause:
granting, via an authorization system to one or more user accounts associated with a first environment of a multi-cloud environment, one or more permissions of a plurality of permissions associated with the multi-cloud environments, each of the plurality of permissions corresponding to a respective one or more of a plurality of actions permitted to be performed on resources;
continuously monitoring use of the one or more permissions by the one or more user accounts;
detecting, based on the continuous monitoring and a machine learning procedure, one or more atypical permission usages by the one or more user accounts;
in response to detecting the atypical permission usages, creating a notification associated with the detected atypical permission usages; and
providing, to an entity associated with the first environment, the notification in association with permissions management tools configurable to modify or revoke the one or more permissions for the one or more user accounts based on the alert.

9. The permissions management system of claim 8, wherein the user accounts comprise identities and the authorization system comprises a system that grants access to the identities.

10. The permissions management system of claim 8, the permissions management system further configurable to cause:
generating, based on detecting the atypical permission usage, a forensic report detailing the atypical permission usage.

11. The permissions management system of claim 8, the permissions management system further configurable to cause:
based on prior activity log information, classifying, and determining typical behavior for the one or more user accounts.

12. The permissions management system of claim 11, the permissions management system further configurable to cause:
providing, to the entity, a selection configurable to allow the entity to choose from pre-configured alerts to be sent to the entity in response to atypical or suspicious activity in the first environment.

13. The permissions management system of claim 12, the permissions management system further configurable to cause:
notifying, based on preconfigured alerts selected by the entity, that an account has performed an unusual number of tasks.

14. The permissions management system of claim 13, the permissions management system further configurable to cause:
automatically populating new permissions associated with a new role, based on historical activity of users selected by the entity.

15. A computer program product comprising non-transitory computer-readable program code capable of being executed by one or more processors when retrieved from a non-transitory computer-readable medium, the program code comprising instructions configurable to cause the one or more processors to perform a method comprising:
granting, via an authorization system to one or more user accounts associated with a first environment of a multi-cloud environment, one or more permissions of a plurality of permissions associated with the multi-cloud environments, each of the plurality of permissions corresponding to a respective one or more of a plurality of actions permitted to be performed on resources;
continuously monitoring use of the one or more permissions by the one or more user accounts;
detecting, based on the continuous monitoring and a machine learning procedure, one or more atypical permission usages by the one or more user accounts;
in response to detecting the atypical permission usages, creating a notification associated with the detected atypical permission usages; and
providing, to an entity associated with the first environment, the notification in association with permissions management tools configurable to modify or revoke the one or more permissions for the one or more user accounts based on the alert.

16. The computer program product of claim 15, wherein the user accounts comprise identities and the authorization system comprises a system that grants access to the identities.

17. The computer program product of claim 15, the method further comprising:
generating, based on detecting the atypical permission usage, a forensic report detailing the atypical permission usage.

18. The computer program product of claim 15, the method further comprising:
based on prior activity log information, classifying, and determining typical behavior for the one or more user accounts.

19. The computer program product of claim 18, the method further comprising:
providing, to the entity, a selection configurable to allow the entity to choose from pre-configured alerts to be sent to the entity in response to atypical or suspicious activity in the first environment.

20. The computer program product of claim 18, the method further comprising:
notifying, based on preconfigured alerts selected by the entity, that an account has performed an unusual number of tasks.

* * * * *